(12) United States Patent
Lee et al.

(10) Patent No.: US 6,638,328 B1
(45) Date of Patent: Oct. 28, 2003

(54) BIMODAL SLURRY SYSTEM

(75) Inventors: Shen-Nan Lee, Judung Jen (TW); Tsu Shih, Hsin-Chu (TW); Syun Ming Jang, Hsin-Chu (TW)

(73) Assignee: Taiwan Semiconductor Manufacturing Co. Ltd, Hsin Chu (TW)

( * ) Notice: Subject to any disclaimer, the term of this patent is extended or adjusted under 35 U.S.C. 154(b) by 0 days.

(21) Appl. No.: 10/132,441

(22) Filed: Apr. 25, 2002

(51) Int. Cl.[7] .............................. C09G 1/02; C09G 1/04
(52) U.S. Cl. .............................. 51/309; 51/307; 51/308; 51/298; 106/3
(58) Field of Search .................... 51/307, 308, 309, 51/298; 106/3; 438/692, 693; 252/79.1, 79.2

(56) References Cited

U.S. PATENT DOCUMENTS 6,375,545 B1 * 4/2002 Yano et al. .................... 451/36

* cited by examiner

*Primary Examiner*—Michael Marcheschi
(74) *Attorney, Agent, or Firm*—Tung & Associates

(57) ABSTRACT

A bimodal slurry system for a chemical mechanical polishing process including a dispersion comprising a plurality of first particles and a plurality of at least one type of second particles said first particles having a mean particle diameter larger by at least a factor of 3 than a mean particle diameter of the at least one type of second particles said first particles further being compressible.

19 Claims, 2 Drawing Sheets

BIMODAL SLURRY SYSTEM

FIELD OF THE INVENTION

This invention generally relates to polishing slurries and more particularly to polishing slurries with a bimodal mean particle size useful for chemical mechanical polishing (CMP) of semiconductor wafers including copper metal interconnects formed in low-k dielectric material.

BACKGROUND OF THE INVENTION

In semiconductor fabrication, various layers of insulating material, semiconducting material and conducting material are formed to produce a multilayer semiconductor device. The layers are patterned to create features that taken together, form elements such as transistors, capacitors, and resistors. These elements are then interconnected to achieve a desired electrical function, thereby producing an integrated circuit (IC) device. The formation and patterning of the various device layers may be accomplished using various fabrication techniques including oxidation, implantation, deposition, epitaxial growth of silicon, lithography, etching, and planarization.

Planarization, for example, is an increasingly important in semiconductor manufacturing technology. As device sizes decrease, the importance of achieving high resolution features through photolithographic processes correspondingly increases thereby placing more severe restraints on the degree of planarity of a semiconductor wafer processing surface. Excessive degrees of process surface nonplanarity will affect the quality of several semiconductor process including, for example, in a photolithographic process, the positioning the image plane of the process surface within an increasingly limited depth of focus window to achieve high resolution semiconductor feature patterns.

One planarization process is chemical mechanical polishing (CMP). CMP is increasingly being used for planarizing dielectrics and other layers, including applications with increasingly stringent critical dimension semiconductor fabrication processes. CMP planarization is typically used several different times in the manufacture of a multi-layer semiconductor device. For example, CMP is used as one of the processes in preparing a layered device structure in a multi-layer device for subsequent processing. CMP is used to remove excess metal after filling conductive metal interconnects such as vias and trench lines with metal to electrically interconnect the several layers and areas that make up a multi-layer semiconductor device.

In a typical process for forming conductive interconnections in a multi-layer semiconductor device a damascene process is used to form vias and trench lines for interconnecting different layers and areas of the multilayer device. Vias (e.g., V1, V2 etc. lines) are generally used for vertically electrically interconnecting semiconductor device layers and trench lines (e.g., M1, M2, etc. lines) are used for electrically interconnecting semiconductor device areas within a layer. Vias and trench lines are typically formed as part of a damascene process. Although there are several different methods for forming damascene structures, one typical method generally involves patterning and etching a semiconductor feature, for example a via opening within an insulating dielectric layer to make contact with a conductive area within an underlying layer of the multilayer device. The via opening (plug) may then be filled with for example, copper to form a via (plug) followed by a CMP step to remove excess metal deposited on the insulating dielectric layer surface and to planarized the surface for a subsequent processing step. A second insulating dielectric layer is then deposited followed by patterning and etching the second insulating dielectric layer to form a trench opening situated over the via. The trench opening is then filled with a metal, for example, copper, to form trench lines (intra-layer horizontal metal interconnections). A second CMP step is then carried out similar to the first CMP step to remove excess metal and to planarize the process wafer surface in preparation for further processing.

CMP is widely accepted as the preferred process for many planarization processes including planarizing copper filled trench lines. CMP is the method of choice particularly for smaller device fabrication technologies including dimensions of less than about 0.27 micron. CMP generally includes placing a process surface of the wafer in contact against a flat polishing surface, and moving the wafer and the polishing surface relative to one another. The polishing action is typically aided by a slurry which includes for example, small abrasive particles such as colloidal silica ($SiO_2$) or alumina ($Al_2O_3$) that abrasively act to remove a portion of the process surface. Additionally, the slurry may additionally include chemicals that react with the process surface to assist in removing a portion of the surface material, the slurry typically being separately introduced between the wafer surface and the polishing pad. During the polishing or planarization process, the wafer is typically pressed against a rotating polishing pad. In addition, the wafer may also rotate and oscillate back and forth over the surface of the polishing pad to improve polishing effectiveness.

Typically CMP polishing slurries contain an abrasive material, such as silica or alumina, suspended in an oxidizing, aqueous medium. There are various mechanisms disclosed in the prior art by which metal surfaces can be polished with slurries. The metal surface may be polished using a slurry where a surface film is not formed causing the process to proceed by mechanical removal of metal particles. In using this method, the chemical dissolution rate should be slow in order to avoid wet etching. A more preferred mechanism is, however, one where a thin abradable layer is continuously formed by reaction between the metal surface and one or more components in the slurry such as a complexing agent and/or a film forming layer. The thin abradable layer is then removed in a controlled manner by mechanical action. Once the mechanical polishing process has stopped a thin passive film remains on the surface and controls the wet etching process. Controlling the chemical mechanical polishing process is much easier when a CMP slurry polishes using this mechanism.

There are also several different types of slurries used in the CMP process. The most common abrasives used are silica ($SiO_2$), alumina ($Al_2O_3$), ceria ($CeO_2$), titania ($TiO_2$), and zirconia ($ZrO_2$). The abrasives are typically formed using two different methods that result in fumed and colloidal abrasives. Fumed abrasives include agglomerated particles that are larger in size than the dispersed, discrete particles of colloidal abrasives. For the same solids concentration, the removal rate using a fumed abrasive is higher than that using a colloidal abrasive due to sharp edged particle features and a broader particle size distribution in fumed abrasives. For the same reasons, the defect density using a fumed abrasive also tends to be higher.

To minimize defect formation, the colloidal abrasives having a more uniform particle size distribution are preferred. However, to achieve the same material removal rate as using a fumed abrasive, the solids concentration of a colloidal slurry must be almost three times higher. The higher required solids concentration undesirably increases the cost of the slurry.

One particular problem with the prior art methods of CMP involve the unique problems inherent in the increasing use of low-k(dielectric constant) materials as an inter-layer dielectric (ILD) together with copper filled vias and copper interconnect lines (trench lines). The low-k insulating dielectrics generally tend to be highly porous in an effort to lower dielectric constants lower than about 3.0 thereby lowering capacitive effects in the ILD. Lower capacitances are required to reduce signal delay times as feature sizes decrease. Additionally, copper has become the conductor of choice for metal interconnects as device sizes decrease primarily due to low resistivity. Several different materials have been proposed for use as low-k materials including porous inorganic and organic material. Exemplary inorganic materials include, for example, carbon doped silicon dioxide and fluorinated silicon dioxide while some of the organic materials include, for example, Poly(arylene) Ethers, Poly (benzocyclobutenes) and perfluorocyclobutanes (BCB and PFCB), Polytetrofluoroethylene (PTFE), Paralyne-N, Paralyne-F, and Siloxanes.

Some of the unique problems presented by the use of copper together with low-k dielectric materials include for example, poor adhesion between the copper metal and the low-k material, causing peeling to occur upon subjecting the multilayer device to the stresses caused by CMP. Other defects associated with CMP of copper together with low-k materials have included dishing in relatively wide copper areas such as bonding pads and erosion in relatively long and narrow metal filled areas such as copper metal interconnects. Additional CMP defects include unacceptable scratch size, and leaving copper residue on the CMP target surface leading to electrical opens and shorts.

For example, referring to FIG. 1A, a cross sectional side view representation of a portion of a semiconductor waver is shown showing metal interconnect lines (trench lines) e.g., 12A, 12B, 12C filled with copper by forming copper layer 16 over the trench line openings after forming barrier layers e.g., 14, for example tantalum nitride (TaN) within the trench line openings anisotropically etched into a dielectric material for example carbon doped oxide. One of the trench lines, e.g., 12B is shown formed slightly lower resulting in a recessed copper area 16A. IN a typical CMP process, a compressive force directionally indicated by arrow 22 is applied polishing pad 18 which transfers the applied compressive force to the surface of copper layer 16 through a polishing slurring including abrasive particles e.g., 20. As conceptually represented in FIG. 1B, the upon polishing the copper layer 16 to achieve planarity, the polishing force cannot effectively be applied to obtain polishing action in recessed area 16A if the abrasive particles e.g., 20, have a mean diameter smaller than the recessed dimension. As a result, copper residue in recessed area 16A is left on the semiconductor wafer surface causing, for example, an electrical short.

Further, the lower strength of the low-k materials has led to increased vulnerability of copper/low-k systems to CMP induced defects caused by slurries using abrasives with relatively high hardness such as fumed alumina and silica. On the other hand, slurries with colloidal particles including alumina and silica require excessively long polishing times unacceptably reducing wafer throughput. As such, it has been difficult to develop CMP methods including abrasives slurries that can accomplish both requirements of high material removal rate while minimizing the introduction of defects at the semiconductor wafer surface.

For example, using a fumed alumina ($Al_2O_3$) slurry system dishing over about a 120 micron by about 120 micron square area results in an out-of-planarity dimension of greater than about 2500 Angstroms while a silica ($Si_2O_3$) system has dishing over the same area of less than about 1000 Angstroms. The same results hold for erosion over a square area of about 300 by about 300 microns. The Cu removal rate using a fumed alumina ($Al_2O_3$) slurry is typically about 4500 to about 9000 Angstroms/min, while a fumed silica slurry typically has a removal rate of about 5000 Angstroms/min. Both the alumina and silica slurry systems typically have some associated peeling of low dielectric layers associated with copper interconnect lines.

Therefore, there is a need in the semiconductor art to develop a slurry for CMP that is able to accomplish both the goals of achieving acceptable material removal rates while minimizing CMP induced defects.

It is therefore an object of the invention to provide a slurry for CMP use in semiconductor wafer polishing that is able to accomplish both the goals of achieving acceptable material removal rates while minimizing CMP induced defects and additionally overcoming other shortcomings and deficiencies in the prior art.

SUMMARY OF THE INVENTION

To achieve the foregoing and other objects, and in accordance with the purposes of the present invention, as embodied and broadly described herein, the present invention provides a bimodal slurry system for a chemical mechanical polishing process In a first embodiment of the present invention, the bimodal slurry system includes a dispersion comprising a plurality of first particles and a plurality of at least one type of second particles said first particles having a mean particle diameter larger by at least a factor of 3 than a mean particle diameter of the at least one type of second particles said first particles further being compressible.

In related embodiments, the plurality of first particles has a mean particle diameter of from about 100 nanometers to about 300 nanometers. Further, the plurality of at least one type of second particles has a mean particle diameter from about 10 nanometers to about 50 nanometers.

In another embodiment, the first plurality of particles includes a material having a Young's Modulus of from about 10 to about 200 kPa over a temperature range of about 25 degrees Centigrade to about 80 degrees Centigrade.

In yet another embodiment, a portion of the plurality of at least one type of second particles is disposed around the periphery of at least a portion of the plurality of first particles.

In another embodiment, the plurality of at least one type of second particles includes at least one of a metal oxide, a carbide, and a nitride. Further, the metal oxide is produced by a fuming process.

In another related embodiment, the plurality of at least one type of second particles includes at least one of alumina, titania, zirconia, germania, silica, and ceria.

In another embodiment the first particles are formed of a polymer containing material. Further, the polymer containing material includes an elastomer. Further yet, the elastomer is a polyurethane containing material. Yet further, the polyurethane containing material has a hardness of about 70D to about 95D according to an elastomer durometer hardness test.

In another embodiment, the plurality of first particles has a relatively lower hardness compared to the plurality of at least one type of second particles according to an equivalent Rockwell hardness.

In a related embodiment, the plurality of first particles is formed of a porous inorganic material having an interconnecting porosity from about 20 to about 80 percent.

In other related embodiments, the bimodal slurry further includes at least one of an oxidizer, a complexing agent, and an organic amino compound. Further, the bimodal slurry includes a total solids content of about 0.1 percent to about 10 percent. Further the ratio of the plurality of first particles to the plurality of at least one type of second particles is from about 5 percent to about 60 percent.

In another embodiment, the plurality of first particles and the plurality of at least one type of second particles include at least one of agglomerated primary particles and dispersed primary particles.

In a related embodiment, the plurality of first particles includes substantially dispersed primary particles and the plurality of at least one type of second particles includes agglomerated primary particles. In another related embodiment, the plurality of the at least one type of second particles are substantially dispersed primary particles.

These and other embodiments, aspects and features of the invention will be better understood from a detailed description of the preferred embodiments of the invention which are further described below in conjunction with the accompanying Figures.

BRIEF DESCRIPTION OF THE DRAWINGS

FIGS. 1A and 1B are conceptual cross section side view representations of a portion of a semiconductor surface undergoing a CMP process according to the prior art.

DETAILED DESCRIPTION OF THE PREFERRED EMBODIMENTS

Figure 1C:
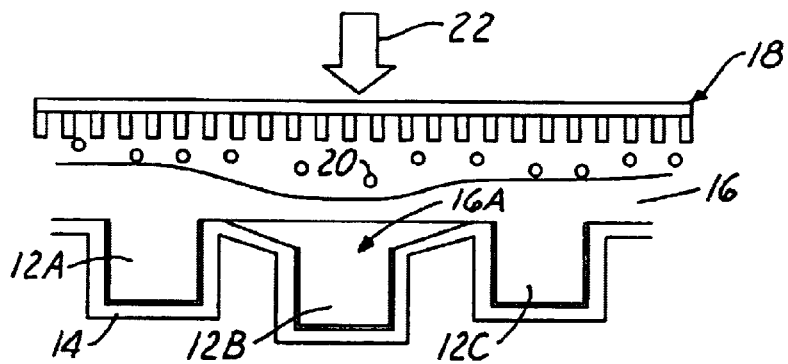
FIG. 1C is a conceptual cross section side view representations of a portion of a semiconductor surface undergoing a CMP process using the bimodal slurry according to one embodiment of the present invention.
Figure 1C:
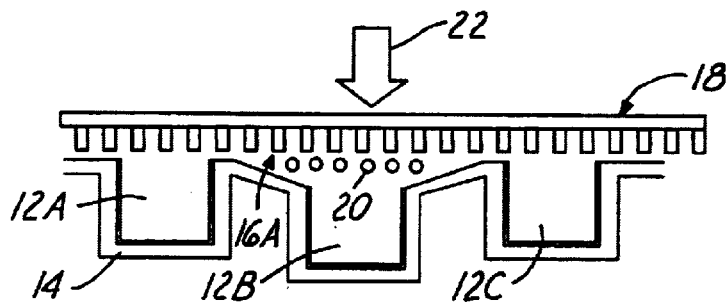
Figure 1C:
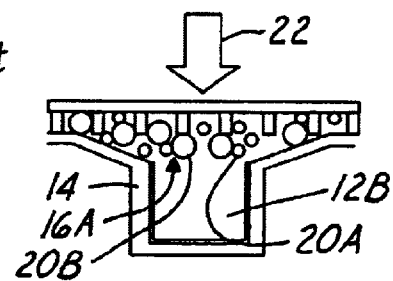

In describing the details of the preferred embodiments of this invention, selected terms used herein are defined as follows. The chemical mechanical polishing slurry, ("slurry system"), includes one or more of an abrasive, oxidizer, a complexing agent, and an organic amino compound. The term "copper" will be understood to include pure copper and alloys thereof. As used herein, "low-k" means having a dielectric constant of less than about 3.0.

Although the slurry system according to present invention is explained with reference to copper conductors included in a low-k dielectric material associated with a multilayer semiconductor device, it will be appreciated that the slurry system may be advantageously used in a wide variety of polishing activities where it would be advantageous to achieve the dual goals of a high material removal rate and a reduced polishing induced defect density, by using the bimodal slurry system of the present invention which includes a base particle system having a relatively large particle size and an abrasive particle system having a relatively smaller particle size whereby abrasive interaction with a polishing surface is modified by the compressibility of the relatively larger particles system.

For example, the present invention may be advantageously used for CMP of low-k materials alone or in conjunction with metal layers. Exemplary low-k inorganic materials include, for example, carbon doped oxide (C-oxide), fluorine doped oxide, porous oxides, xerogels, or SOG (spin-on glass). Exemplary organic materials include, for example, Poly(arylene) Ethers, Poly (benzocyclobutenes) and perfluorocyclobutanes (BCB and PFCB), Polytetrofluoroethylene (PTFE), Paralyne-N, Paralyne-F, and Siloxanes. Metal layers may include for example, W, Al, Cu.

While the bimodal slurry system of the present invention may be used on a wide variety of systems advantageously, it is most advantageously used with low-k materials including copper conducting areas such as bonding pads and metal interconnect lines to prevent peeling among other advantages, of the uppermost low-k dielectric layers associated with a multilayer device.

Preferably, an oxidizing agent is used with the bimodal slurry system according to the present invention. For example, the oxidizing agent according to the present invention acts to form an oxide layer of the material, typically a metal, for example, CuO on top of the copper metal. An exemplary oxidizer may include a compound with a peroxy group such as peroxides and percarbonates. For example, hydrogen peroxide is a suitable oxidizing agent.

Organic amino compounds that may be advantageously used in the bimodal slurry system according to the present invention include alkylamines, alcohol amines, amino acids, urea, derivatives of urea, and mixtures thereof. For example, suitable organic amino compounds include long chain alkylamines and alcoholamines.

In use of the bimodal slurry system according to the present invention, it is preferable to maintain the pH of the bimodal slurry system within a range about 2.0 to about 12.0, and more preferably between from about 4.0 to about 8.0.

In one embodiment of the present invention the bimodal slurry according to the present invention includes a base particle system including a plurality of base particles with a relatively larger mean particle diameter surrounded by a relatively smaller mean diameter particle system with a plurality of abrasive particles disposed around the periphery of the larger base particles. The larger base particles are preferably compressible, formed of, for example, an inorganic or organic polymer material. By the use of the term compressible herein is meant having a Young's Modulus of between about 10 to about 200 kPa over a temperature range of about 25° C. to about 80° C. A preferable polymer for the base particle is, for example, an elastomeric material including a polyurethane elastomeric material. Polyurethane elastomers have high elongation, high tensile strength and high modulus. This combination provides toughness and durability and is one of the distinctive characteristics of polyurethane elastomers. Generally, the harder the elastomer, the less it will permit elongation (compression). Further, the properties of elastomeric polymers are easily altered by chemical additives and processing conditions that are well known in the art to alter the hardness, for example, over a range of about 70D to about 95D according to an elastomer durometer hardness test.

The base particle may additionally be porous or nonporous. For example, the base particle may be formed by a sol-gel process where the porosity of the material may be varied over a wide range depending on the chemical processing conditions. Preferably the base particle is a colloidal particle that may be individually dispersed. For example, sol-gel methods are known in the art for creating monodisperse colloids having a range of porosity features. The porosity of the inorganic material formed from a sol gel process may include, for example, interconnecting pores with a nominal porosity of between about 20 percent and 80 percent and a nominal pore size of about 1 Angstrom to about 10 Angstroms.

The larger particle may be made by any method known for creating particles including sol-gel, hydrothermal or plasma processes. Preferably, the base particles are colloidal particles made by known sol-gel process. For example, inorganic silica monodisperse particles may be made from, tetraethylorthosilicate (TEOS) or tetramethylorthosilicate (TMOS) by well known acid or base catalyzed reactions. As mentioned a preferred organic material for the compressible base particle includes a polyurethane elastomer. Monodisperse polyurethane elastomer particles may be made by conventional methods at the appropriate sizes for use according to the present invention.

Figure 3A:
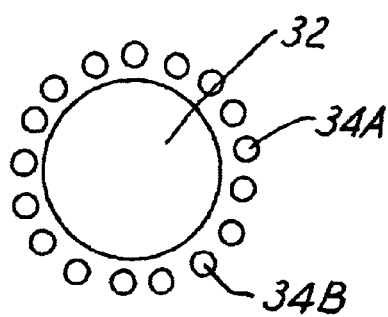
FIGS. 3A through 3C are conceptual cross section side view representations of different embodiments of the bimodal slurry system according to the present invention.

According to the bimodal slurry system of the present invention, a plurality of smaller abrasive particles are mixed with a large base particle to form a plurality of agglomerated particles having a larger particle size and a smaller particle size. Preferably, the smaller abrasive particles are deposited on the surface of the larger base particle thereby forming a bimodal particle system. Referring to FIG. 3A is an idealized conceptual schematic of a bimodal particle system showing for individually dispersed particles. For example, relatively larger base particle 32, formed of a compressible material is surrounded by relatively smaller abrasive particles e.g., 34A, 34B with a relatively higher hardness, for example a fumed metal oxide. By relatively larger or relatively smaller as used herein means larger or smaller by at least a factor of 3.

Figure 3B:
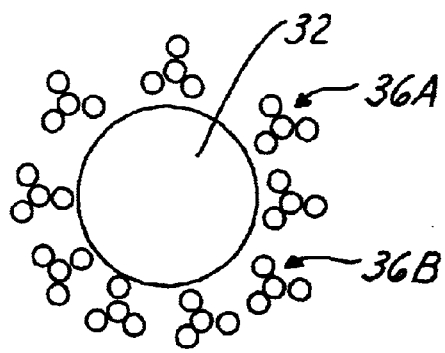
Figure 3C:
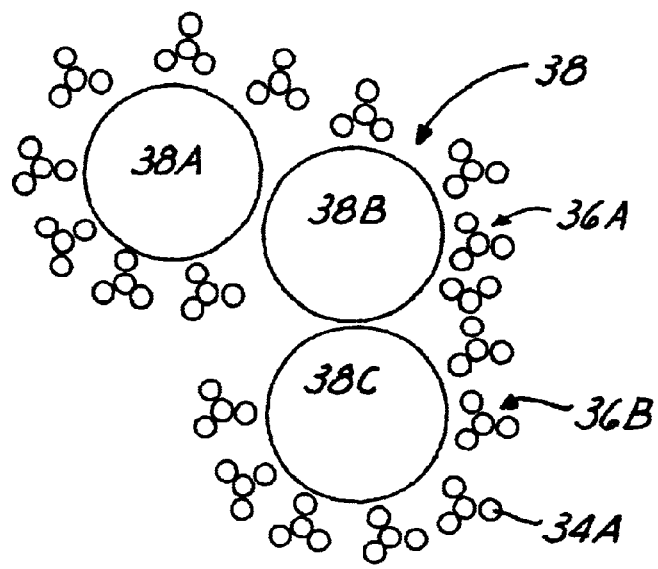

The relatively smaller and relatively larger particles that are advantageously used in the bimodal slurry system according to the present invention may include agglomerates of primary particles or individually dispersed primary particles or mixtures thereof. For example, referring to FIG. 3B, the larger base particle 32 may be an individually dispersed particle while the smaller abrasive particles may form an agglomerate e.g., 36A 36B. Referring to FIG. 3C, for example, shows an idealized conceptual representation of a bimodal particle-system forming the bimodal slurry of the present invention where both the larger base particle e.g., 38, formed from primary particles 38A, 38B, and 38C, and the relatively smaller abrasive particles e.g., 36A and 36B both form agglomerates of primary particles, e.g., 34A.

The term "particle" as it is used herein refers to both agglomerates of more than one primary particle and to single primary particles, however the "mean particle diameter" as used herein refers to the mean diameter of the primary particle whether agglomerated with other primary particles or not.

In an exemplary embodiment, the larger base particle system has a plurality of base particles having a mean particle diameter of from about 100 nm to about 300 nm, more preferably about 150 nm while the smaller abrasive particle system has a plurality of abrasive particles having a mean particle diameter of from about 10 nm to about 50 nm, more preferably about 30 nm. By the term mean particle diameter is meant a mean diameter taken from a statistically significant sampling of the average equivalent spherical diameter of primary particles when using TEM image analysis.

The smaller abrasive particles may be deposited onto the base particles by any known means including adjusting the zeta potential of dispersed particles in solution by adjusting the pH so that pre-formed smaller particles, for example by a fumed process, are deposited on the base particle surface. Alternatively, the smaller abrasive particle may be precipitated in-situ onto the base particle surface by known methods for producing sol-gel precipitates. Alternatively, for example, a layer of incompletely reacted TEOS may be first formed on the surface of the base particles to form glue-like coating prior to contacting the base particle surface with the smaller abrasive particles.

According to the present invention, the smaller abrasive particles may include one or more inorganic metal oxides such as alumina, titania, zirconia, germania, silica, ceria or mixtures thereof. The smaller abrasive particles may also include nitrides and carbides including mixtures of nitrides, carbides and metal oxides.

The smaller abrasive particles may be produced by any techniques known to those skilled in the art. For example, the particles may be produced using fumed, sol-gel, hydrothermal, or plasma processes. Preferably, the smaller abrasive particle is a metal oxide formed by a fumed, precipitated, or sol-gel process, more preferably a fumed process thereby forming a sharper edged particle for higher material removal rates.

In another embodiment, the bimodal slurry system of the present invention preferably includes from about 0.1 to about 10.0 weight percent solids, more preferably between about 1.0 and about 8.0 weight percent solids. In the bimodal slurry system according to the present invention, for example, the smaller abrasive particles include from about greater than 50 percent to about 95 percent of the volume of the solids content of the bimodal slurry.

The bimodal slurry system of the present invention may be used with any type of polishing device including a CMP polishing device which provides relative motion between the material to be polished and a polishing surface, such as orbital motion or linear motion devices.

The aqueous dispersion of the bimodal slurry system of the present invention may be produced utilizing conventional techniques, such as slowly adding the bimodal abrasive to an appropriate media, for example, deionized water, to form a dispersion. The dispersion is typically completed by subjecting it to high shear mixing conditions known to those skilled in the art. The pH of the slurry may be adjusted away from the isoelectric point to maximize the dispersion stability by minimizing further agglomeration.

During a polishing process, for example, a CMP process, the slurry composition and the resulting abrasive action of the slurry are key parameters when polishing a target surface, including for example, a semiconductor wafer surface. The backpressure that is applied to the rotating wafer and the downforce that is applied to the polishing pad are the main parameters that control the polishing action and control the applied compressive force to the semiconductor wafer target surface. The results of the polishing action are measured in terms of thickness non-uniformity and surface planarity, such as dishing or erosion, as well as the number of optically visible defects typically counted by an automated process.

Figure 4:
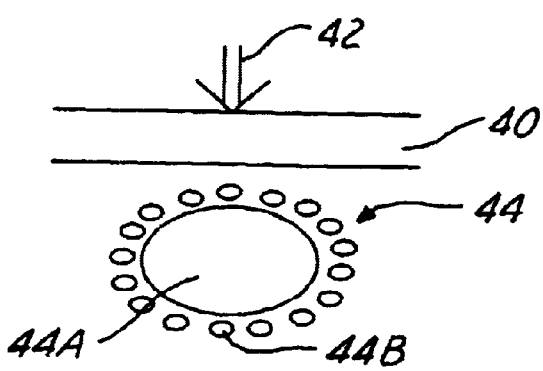
FIG. 4 is a conceptual cross section side view representation of one embodiment of the bimodal slurry system according to the present invention in exemplary operation.

In operation, the bimodal slurry system of the present invention provides a system whereby the larger base particles are compressible such that it is believed a lower localized compressive force is applied to the polishing target surface, a portion of the applied compressive force being absorbed by the compressible base particles. For example, as conceptually shown in FIG. 4, a polishing pad 40 applies a compressive force as directionally indicated by arrow 42 which is transferred to bimodal particle 44 having relatively larger compressible particles 44A and relatively smaller particles e.g., 44B, causing larger compressible particles 44A to compress in the direction of the applied compressive force. As a result, the application of the proper compressive force to the target polishing surface, for example about 5 PSI to about 10 PSI is locally modified by the absorbing force action of the compressible base particles so as to smooth variations in the applied compressive force to the polishing target surface, for example, a semiconductor wafer with multiple layers, thereby avoiding application of excessive forces that result in defects including peeling of the low-k dielectric layers. For example, it is believed that the compressible base particles act to absorb sudden changes in applied compressive forces across the polishing target surface, for example, a semiconductor wafer with multiple layers, thereby avoiding catastrophic peeling of the low-k dielectric layers. The compressible base particles are also believed to act to equalize distributed forces across the polishing target surface, for example a semiconductor wafer, thereby reducing dishing and Other advantages of the bimodal slurry system according to the present invention are the removal of copper residues left on the surface. For example, FIG. 1C, a conceptual side view representation of a portion of a semiconductor wafer, demonstrates an advantage of the bimodal slurry system of the present invention over the prior art in the ability to more effectively polished recessed areas with residual copper. As shown in FIG. 1C, with the bimodal system, larger particles e.g. 20B together with smaller particles 20A are better able to polish the recessed area 16A.

Figure 2A:
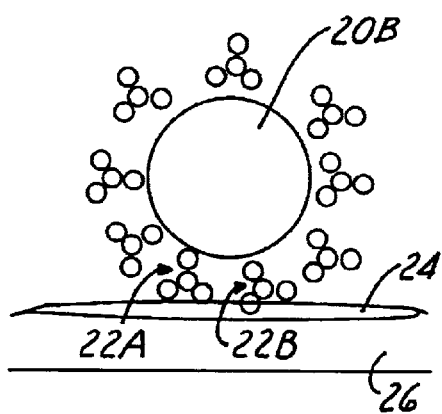
FIG. 2A and 2B are conceptual cross section side view representations of a portion of a semiconductor surface undergoing a CMP process using the bimodal slurry according to one embodiment of the present invention.
Figure 2B:
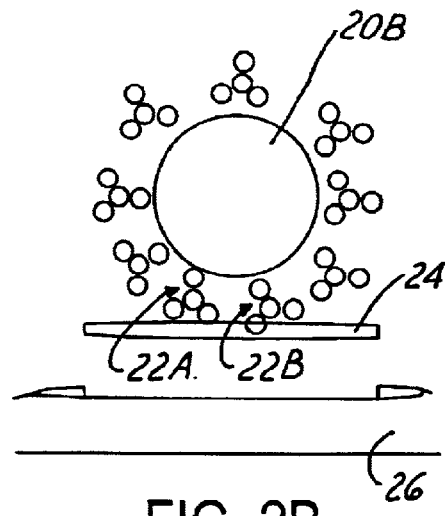

FIGS. 2A and 2B additionally conceptually show that the bimodal slurry system of the present invention is able to more effectively attach to, for example, copper residues, increasing the surface area of contact with the copper surface compared to the contact area of for example a single particle included in a single mode slurry system.

For example, primary particle agglomerates 22A and 22B (e.g., 36A, 36B in FIG. 3B) surrounding larger base particle 20B (e.g., 32 in FIG. 3B), contact copper residual area 24 on substrate 26 to more effectively attach and remove copper residual area 24 as shown in FIG. 2B.

In exemplary operation, using the bimodal slurry system according to the present invention in polishing a carbon doped oxide with copper interconnect lines and using a polyurethane base particle with a mean diameter of about 150 nm and with fumed silica ($SiO_2$) having a mean particle diameter of about 50 nm deposited on the base particle achieved the following results. Dishing and erosion was reduced from about 1200 Angstroms to about 500 Angstroms as measured over a square area of about 300 by about 300 microns.

Further, the number of optically measured CMP defects was reduced from about 14500 to less than about 100. Further, the surface was free of scratches visible to the naked eye, and amount of copper residue remaining on the surface was reduced as measured by, for example, XPS.

Therefore, according to the present invention, the bimodal slurry system according to the present invention combines a smaller particle abrasive with a larger compressible base particle such that a material removal rate may be optimized while minimizing polishing induced defects. For example, the removal rate the smaller abrasive smaller particles is retained while defect formation is minimized by having a compressible base particle acting as a localized force absorber thereby advantageously modifying the applied polishing force distribution to minimize dishing, erosion, defect (e.g., divot) formation, and minimizing catastrophic peeling of ILD layers.

The preferred embodiments, aspects, and features of the invention having been described, it will be apparent to those skilled in the art that numerous variations, modifications, and substitutions may be made without departing from the spirit of the invention as disclosed and further claimed below.

What is claimed is:

1. A bimodal slurry system for a chemical mechanical polishing (CMP) process comprising:

an aqueous dispersion comprising a plurality of first particles and a plurality of at least one type of second particles;

said first particles having a mean particle diameter larger by at least a factor of 3 than a mean particle diameter of the at least one type of second particles;

said first particles formed of either (1) a polymer material or (2) a porous inorganic material having an interconnecting porosity from about 20 to about 80 percent;

said first particles further being compressible in a CMP process;

said at least one type of second particles being deposited to surround the periphery of the first particles;

said at least one type of second particles having a relatively higher hardness compared to the first particles.

2. The bimodal slurry system of claim 1, wherein the plurality of first particles has a mean particle diameter of from about 100 nanometers to about 300 nanometers.

3. The bimodal slurry system of claim 1, wherein the plurality of at least one type of second particles has a mean particle diameter from about 10 nanometers to about 50 nanometers.

4. The bimodal slurry system of claim 1, wherein the first plurality of particles includes a material having a Young's Modulus of from about 10 to about 200 kPa over a temperature range of about 25 degrees Centigrade to about 80 degrees Centigrade.

5. The bimodal slurry system of claim 1, wherein the plurality of at least one type of second particles includes at least one of a metal oxide, a carbide, and a nitride.

6. The bimodal slurry system of claim 5, wherein the metal oxide is produced by a fuming process.

7. The bimodal slurry system of claim 1, wherein the plurality of at least one type of second particles includes at least one of alumina, titania, zirconia, germania, silica, and ceria.

8. The bimodal slurry system of claim 1, wherein the polymer material comprises a polymer elastomer.

9. The bimodal slurry system of claim 8, wherein the polymer elastomer is a polyurethane elastomer.

10. The bimodal slurry system of claim 9, wherein the polyurethane elastomer has a hardness of about 70D to about 95D according to an elastomer durometer hardness test.

11. The bimodal slurry system of claim 1, further comprising at least one of an oxidizer, a complexing agent, and an organic amino compound.

12. The bimodal slurry system of claim 1, comprising a solids content of about 0.1 percent to about 10 percent.

13. The bimodal slurry system of claim 1, wherein the ratio of the plurality of first particles to the plurality of at least one type of second particles is from about 5 percent to about 60 percent.

14. The bimodal slurry system of claim 1, wherein the plurality of first particles and the plurality of at least one type of second particles include at least one of agglomerated primary particles and dispersed primary particles.

15. The bimodal slurry system of claim 14, wherein the plurality of first particles comprise dispersed primary particles and the plurality of at least one type of second particles comprise agglomerated primary particles.

16. The bimodal slurry system of claim 15, wherein the plurality of at least one type of second particles comprise dispersed primary particles.

17. The bimodal slurry system of claim 1, wherein the at least one type of second particles include from about greater than 50 percent to about 95 percent of the volume of the solids content of the bimodal slurry.

18. The bimodal slurry system of claim 1, wherein the at least one type of second particles are attached to the first particles.

19. The bimodal slurry system of claim 1, wherein the at least one type of second particles are precipitated onto the first particles.

* * * * *